(12) United States Patent
Nakano et al.

(10) Patent No.: US 11,562,197 B2
(45) Date of Patent: Jan. 24, 2023

(54) NON-CONTACT COMMUNICATION MEDIUM AND RECORDING MEDIUM CARTRIDGE

(71) Applicant: SONY CORPORATION, Tokyo (JP)

(72) Inventors: Hiroaki Nakano, Tokyo (JP); Eiji Nakashio, Miyagi (JP); Kazuo Anno, Miyagi (JP); Takanobu Iwama, Miyagi (JP); Shinya Tochikubo, Miyagi (JP); Naohiro Adachi, Tokyo (JP); Masayoshi Abe, Tokyo (JP); Uichiro Omae, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 17/046,071

(22) PCT Filed: Mar. 28, 2019

(86) PCT No.: PCT/JP2019/013578
§ 371 (c)(1),
(2) Date: Oct. 8, 2020

(87) PCT Pub. No.: WO2019/198527
PCT Pub. Date: Oct. 17, 2019

(65) Prior Publication Data
US 2021/0034943 A1   Feb. 4, 2021

(30) Foreign Application Priority Data

Apr. 9, 2018 (JP) ............................. JP2018-075044

(51) Int. Cl.
*G11B 23/04* (2006.01)
*G06K 19/077* (2006.01)
*G11B 23/107* (2006.01)

(52) U.S. Cl.
CPC ...... *G06K 19/07783* (2013.01); *G11B 23/107* (2013.01)

(58) Field of Classification Search
None
See application file for complete search history.

(56) References Cited

U.S. PATENT DOCUMENTS

| | | | |
|---|---|---|---|
| 7,780,107 B2 * | 8/2010 | Onmori ................ | G11B 23/037 242/348 |
| 2004/0004789 A1 * | 1/2004 | Watanabe ........ | G11B 23/08714 360/132 |

(Continued)

FOREIGN PATENT DOCUMENTS

| JP | 2007-018592 A | 1/2007 |
|---|---|---|
| JP | 2009-211743 A | 9/2009 |

(Continued)

OTHER PUBLICATIONS

Kojima Yasushi et al., "Antenna Module, Antenna Module Precursor and Method of Manufacturing Antenna Module," (Published Jun. 26, 2014)—including English-machine translation, pp. 1-19. (Year: 2014).*

(Continued)

*Primary Examiner* — William J Klimowicz
(74) *Attorney, Agent, or Firm* — K&L Gates LLP

(57) ABSTRACT

A non-contact communication medium according to an embodiment of the present technology is a non-contact communication medium for a recording medium cartridge, including: a circuit component; a support substrate; and an antenna coil. The circuit component has a memory unit capable of storing management information relating to the recording medium cartridge therein. The support substrate supports the circuit component. The antenna coil includes a coil unit that is electrically connected to the circuit compo- (Continued)

nent and formed on the support substrate, an inductance value of the coil unit being 0.3 µH or more and 2.0 µH or less.

8 Claims, 10 Drawing Sheets

(56) References Cited

U.S. PATENT DOCUMENTS

| | | | | |
|---|---|---|---|---|
| 2004/0037004 A1* | 2/2004 | Kitahara | ............... | G11B 15/07 360/133 |
| 2004/0101275 A1* | 5/2004 | Abe | ............... | G11B 23/0302 386/247 |
| 2004/0107433 A1* | 6/2004 | Izumida | ............... | G11B 23/042 720/729 |
| 2005/0007296 A1* | 1/2005 | Endo | ............... | G06K 19/07749 343/895 |
| 2006/0180694 A1* | 8/2006 | Battles | ............... | G11B 23/107 242/348 |
| 2008/0065676 A1* | 3/2008 | Hause | ............... | G11B 23/0236 |
| 2009/0145971 A1* | 6/2009 | Yin | ............... | G06K 19/07745 235/492 |
| 2017/0040694 A1* | 2/2017 | Singh | ............... | H02J 50/12 |
| 2018/0212475 A1* | 7/2018 | Noh | ............... | H02J 50/005 |

FOREIGN PATENT DOCUMENTS

| | | |
|---|---|---|
| JP | 2010-079451 A | 4/2010 |
| JP | 2010-200061 A | 9/2010 |
| JP | 5412594 B1 * | 2/2014 |
| JP | 2014-116921 A | 6/2014 |

OTHER PUBLICATIONS

International Search Report dated Jun. 11, 2019 in International Application No. PCT/JP2019/013578.

* cited by examiner

| L value (μH) | Normalized value | | |
|---|---|---|---|
| | CV1.00 | CV1.17 | Accumulated value |
| 0.1 | 79.40 | 33.85 | 26.88 |
| 0.2 | 93.89 | 47.26 | 44.37 |
| 0.3 | 98.80 | 57.03 | 56.34 |
| 0.4 | 100.00 | 64.78 | 64.78 |
| 0.5 | 99.52 | 71.13 | 70.79 |
| 0.6 | 98.22 | 76.43 | 75.07 |
| 0.7 | 96.54 | 80.87 | 78.07 |
| 0.8 | 94.67 | 84.61 | 80.11 |
| 0.9 | 92.75 | 87.76 | 81.40 |
| 1 | 90.84 | 90.39 | 82.11 |
| 1.1 | 88.96 | 92.59 | 82.36 |
| 1.2 | 87.14 | 94.40 | 82.26 |
| 1.3 | 85.40 | 95.88 | 81.88 |
| 1.4 | 83.73 | 97.08 | 81.28 |
| 1.5 | 82.13 | 98.02 | 80.50 |
| 1.6 | 80.60 | 98.75 | 79.59 |
| 1.7 | 79.14 | 99.29 | 78.58 |
| 1.8 | 77.75 | 99.66 | 77.49 |
| 1.9 | 76.43 | 99.89 | 76.34 |
| 2 | 75.16 | 100.00 | 75.16 |
| 2.1 | 73.95 | 100.00 | 73.95 |
| 2.2 | 72.79 | 99.91 | 72.72 |
| 2.3 | 71.68 | 99.74 | 71.49 |
| 2.4 | 70.61 | 99.50 | 70.26 |
| 2.5 | 69.59 | 99.20 | 69.03 |
| 2.6 | 68.61 | 98.85 | 67.82 |
| 2.7 | 67.67 | 98.46 | 66.63 |
| 2.8 | 66.76 | 98.03 | 65.45 |
| 2.9 | 65.89 | 97.57 | 64.30 |
| 3 | 65.05 | 97.09 | 63.16 |

NON-CONTACT COMMUNICATION MEDIUM AND RECORDING MEDIUM CARTRIDGE

TECHNICAL FIELD

The present technology relates to a non-contact communication medium for a recording medium cartridge and a recording medium cartridge including the same.

BACKGROUND ART

In recent years, a magnetic recording medium has been widely used for backing up electronic data, and the like. As one magnetic recording medium, for example, a magnetic tape cartridge has a large capacity and can be preserved for a long time, and thus, the magnetic tape cartridge has attracted increasing attention as a storage medium for big data and the like.

For example, a magnetic tape cartridge of the LTO (Linear Tape Open) standard includes an RFID (Radio Frequency Identification) tag called a cartridge memory (see, for example, Patent Literature 1). The cartridge memory includes an antenna and an IC chip for communication and recording, and is configured to be capable of reading and writing production management information of the magnetic tape, the outline of the recorded content, and the like. The cartridge memory receives a signal magnetic field transmitted from a tape drive (reader/writer) to generate electric power, and thus operates without power supply.

CITATION LIST

Patent Literature

Patent Literature 1: Japanese Patent Application Laid-open No. 2009-211743

DISCLOSURE OF INVENTION

Technical Problem

In recent years, the memory size of the cartridge memory has become larger in proportion to the increase in the recording data size of the magnetic tape. As the memory size of the cartridge memory increases, the power consumed by the cartridge memory also increases. Meanwhile, since this type of cartridge memory is required to operate at a constant magnetic field strength, there is a limitation on the electric power that can be drawn from the antenna. Accordingly, there is a need for a technology for driving a cartridge memory with electric power that can be drawn from an antenna independent of the memory size and ensuring stable communication with a reader/writer.

In view of the circumstances as described above, it is an object of the present technology to provide a non-contact communication medium capable of improving electric power drawn from an antenna, and a recording medium cartridge including the non-contact communication medium.

Solution to Problem

A non-contact communication medium according to an embodiment of the present technology is a non-contact communication medium for a recording medium cartridge, including: a circuit component; a support substrate; and an antenna coil.

The circuit component has a memory unit capable of storing management information relating to the recording medium cartridge therein.

The support substrate supports the circuit component.

The antenna coil includes a coil unit that is electrically connected to the circuit component and formed on the support substrate, an inductance value of the coil unit being 0.3 µH or more and 2.0 µH or less.

In accordance with the non-contact communication medium, since the antenna coil in which the inductance value of the coil unit is 0.3 µH or more and 2.0 µH or less is provided, it is possible to improve electric power that can be drawn from the antenna.

A maximum outer diameter of the coil unit in a major axis direction may be 20 mm or less, and a maximum outer diameter of the coil unit in a minor axis direction may be 10 mm or less.

The inductance value of the coil unit may be 0.8 µH or more and 1.6 µH or less.

A Q-value of the antenna coil may be 30 or more.

The antenna coil may be made of a copper foil having an average thickness of 16 µm or more.

The memory unit may include a non-volatile memory element having a memory capacitance of 16 kilobytes or more.

The circuit component may further have a resonant capacitance unit that is electrically connected to the antenna coil and has a variable capacitance value therein.

A recording medium cartridge according to an embodiment of the present technology includes: an information recording medium; a cartridge case; and a non-contact communication medium.

The cartridge case houses the information recording medium.

The non-contact communication medium includes a circuit component, a support substrate, and an antenna coil.

The circuit component has a memory unit capable of storing management information relating to the information recording medium therein.

The support substrate supports the circuit component.

The antenna coil includes a coil unit that is electrically connected to the circuit component and formed on the support substrate, an inductance value of the coil unit being 0.3 µH or more and 2.0 µH or less.

The information recording medium may be a magnetic tape.

The information recording medium may be a magnetic tape cartridge of an LTO (linear tape open) standard.

Advantageous Effects of Invention

As described above, in accordance with the present technology, it is possible to improve electric power that can be drawn from the antenna.

Note that the effect described here is not necessarily limitative, and any of the effects described in the present disclosure may be provided.

MODE(S) FOR CARRYING OUT THE INVENTION

An embodiment according to the present technology will now be described below with reference to the drawings.

Figure 1:
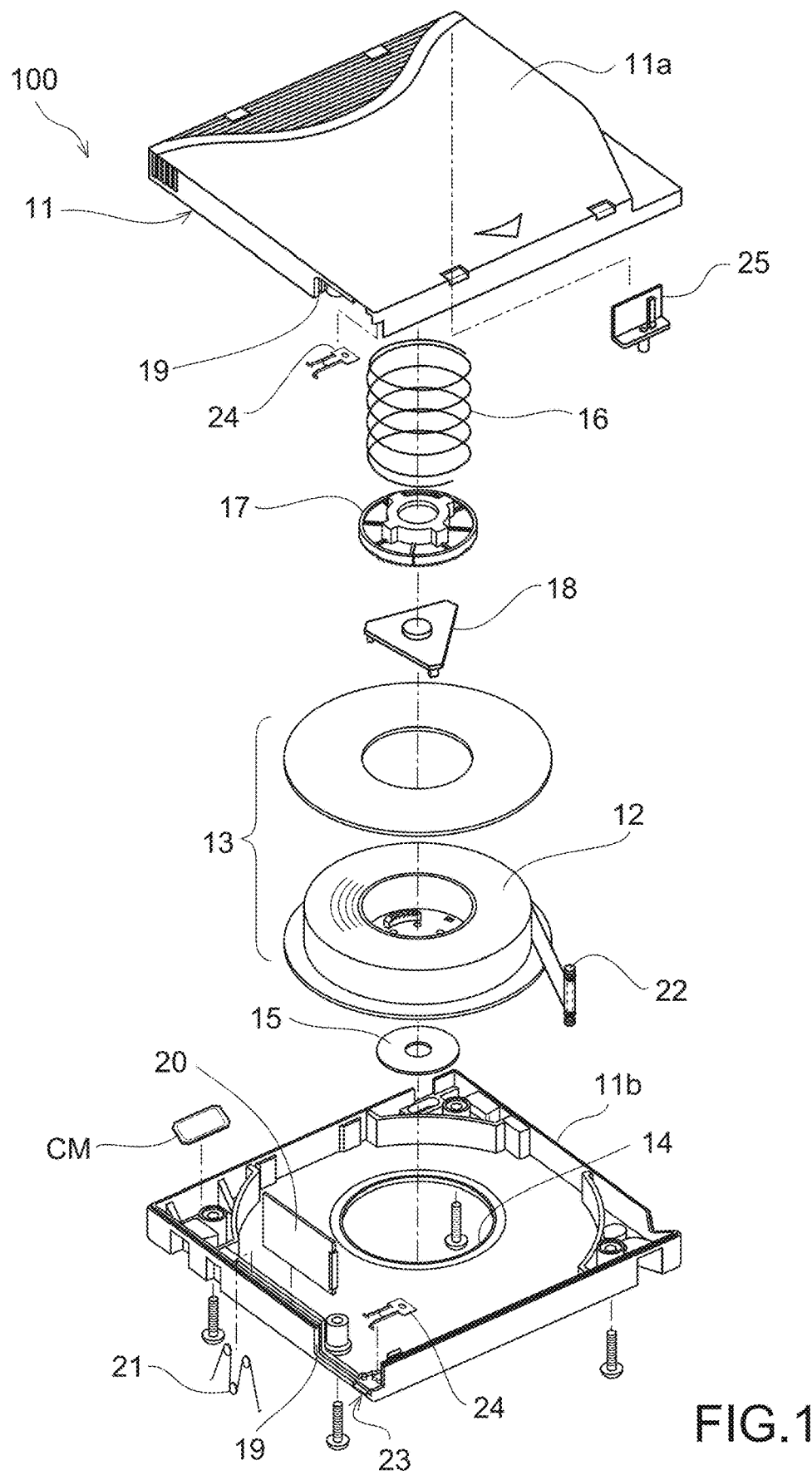
FIG. 1 is an exploded perspective view showing a magnetic tape cartridge according to an embodiment of the present technology.
Figure 2:
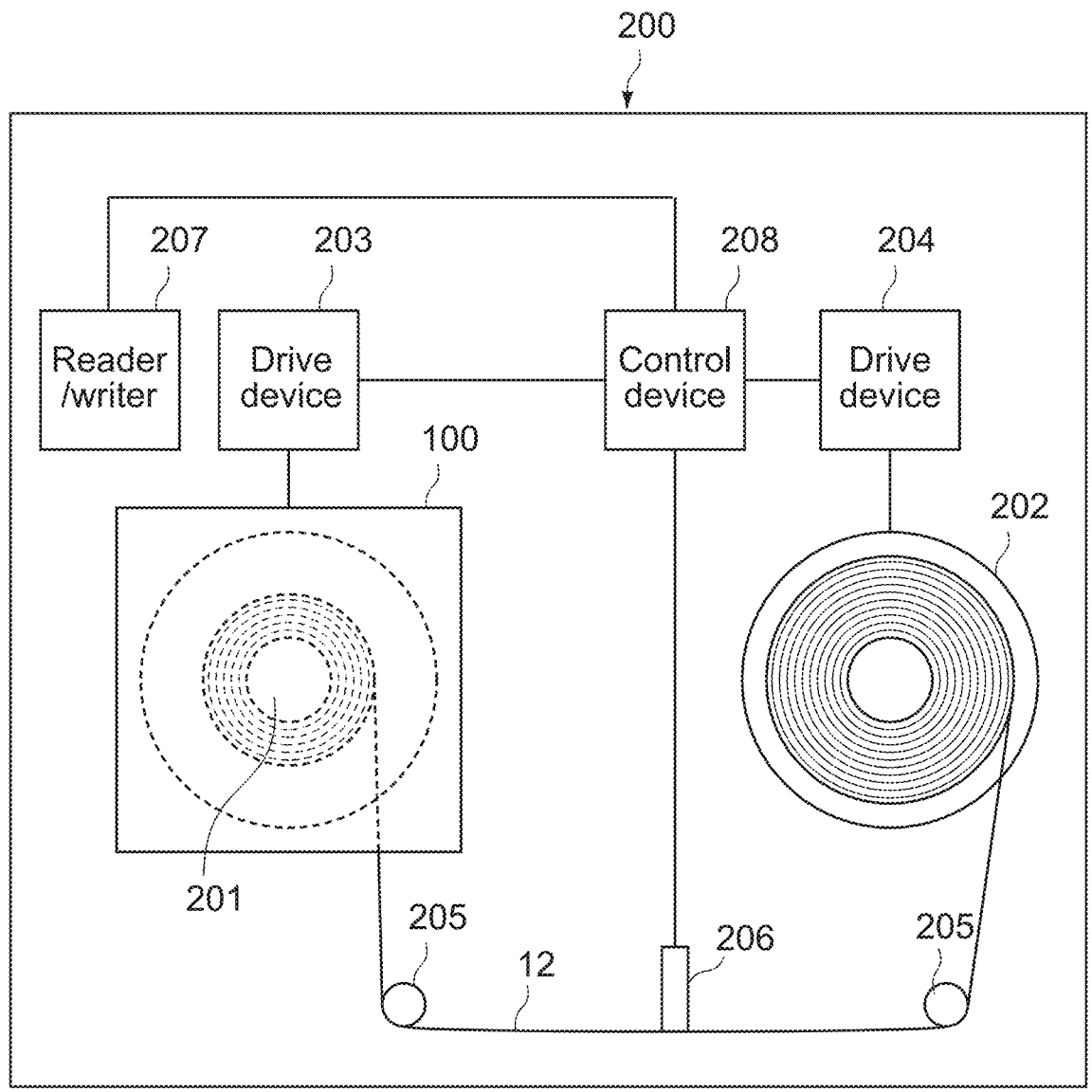
FIG. 2 is a schematic perspective view of a tape drive device.

FIG. 1 is an exploded perspective view showing a magnetic tape cartridge according to an embodiment of the present technology, and FIG. 2 is a schematic perspective view of a tape drive device. In this embodiment, a magnetic tape cartridge of the LTO standard shown in FIG. 1 (hereinafter, referred to as the tape cartridge 100) will be described as a recording medium cartridge. Hereinafter, the configuration of the tape cartridge 100 and a tape drive device 200 shown in FIG. 2 will be schematically described.

[Tape Cartridge]

As shown in FIG. 1, the tape cartridge 100 includes a cartridge case 11 formed by connecting an upper shell 11a and a lower shell 11b by a plurality of screw members. A single tape reel 13 on which a magnetic tape 12 as information recording medium is wound is rotatably accommodated inside the cartridge case 11.

A chucking gear (illustration omitted) that engages with a spindle 201 (see FIG. 2) of the tape drive device 200 is formed in an annular shape at the bottom center of the tape reel 13, and the chucking gear is exposed to the outside through an opening 14 formed in the center of the lower shell 11b. An annular metal plate 15 magnetically attracted to the spindle 201 is fixed to the inner periphery side of the chucking gear.

A reel spring 16, a reel lock member 17, and a spider 18 are disposed between the inner surface of the upper shell 11a and the tape reel 13. They constitute a reel locking mechanism that prevents the tape reel 13 from rotating when the tape cartridge 100 is not in use.

A tape outlet 19 for drawing out one end of the magnetic tape 12 to the outside is provided in one side wall portion of the cartridge case 11. A slide door 20 for opening and closing the tape outlet 19 is disposed inside the side wall portion. The slide door 20 is configured to slide in a direction that opens the tape outlet 19 against the biasing force of a torsion spring 21 by engagement of the tape drive device 200 with a tape loading mechanism (not shown).

A leader pin 22 is fixed to one end portion of the magnetic tape 12. The leader pin 22 is configured to be attachable/detachable to/from a pin holding portion 23 provided on the inner side of the tape outlet 19. The pin holding portion 23 includes an elastic holder 24 for elastically holding the upper end portion and the lower end portion of the leader pin 22 between the upper wall inner surface of the cartridge case 11 (the inner surface of the upper shell 11a) and the bottom wall inner surface (the inner surface of the lower shell 11b), respectively.

Then, in addition to a safety tab 25 for preventing accidental erasure of information recorded on the magnetic tape 12, a cartridge memory CM capable of reading and writing the content related to the information recorded on the magnetic tape 12 in a non-contact manner is provided inside the other side wall of the cartridge case 21. The cartridge memory CM includes a non-contact communication medium in which an antenna coil, an IC chip, and the like are mounted on a substrate.

[Tape Drive Device]

As shown in FIG. 2, the tape drive device 200 is configured to be capable of loading the tape cartridge 100. The tape drive device 200 is configured to be capable loading one tape cartridge 100, but may be configured to be capable of loading a plurality of tape cartridges 100 simultaneously.

The tape drive device 200 includes a spindle 201, a take-up reel 202, a spindle drive device 203, a reel drive device 204, a plurality of guide rollers 205, a head unit 206, a reader/writer 207, a control device 208, and the like.

The spindle 201 includes a head portion that engages with the chucking gear of the tape reel 13 through the opening 14 formed in the lower shell 11b of the tape cartridge 100. The spindle 201 raises the tape reel 13 by a predetermined distance against the biasing force of the reel spring 16, releasing the reel lock function by the reel lock member 17. Thus, the tape reel 13 is rotatably supported inside the cartridge case 11 by the spindle 201.

The spindle drive device 203 causes, in response to a command from the control device 208, the spindle 201 to rotate. The take-up reel 202 is configured to be capable of fixing the tip (leader pin 22) of the magnetic tape 12 drawn from the tape cartridge 100 via the tape loading mechanism (not shown). The plurality of guide rollers 205 guides the travelling of the magnetic tape 12 such that the tape path formed between the tape cartridge 100 and the take-up reel 202 is in a predetermined relative position relative to the head unit 206. The reel drive device 204 causes, in response to a command from the control device 208, the take-up reel 202 to rotate. When data signals are recorded/reproduced on/from the magnetic tape 12, the spindle 201 and the take-up reel 202 are caused to rotate by the spindle drive device 203 and the reel drive device 204 and thus, the magnetic tape 12 is caused to travel.

The head unit 206 is configured to be capable of recording data signals on the magnetic tape 12 or reproducing the data signals written to the magnetic tape 12 in response to a command from the control device 208.

The reader/writer 207 is configured to be capable of reading predetermined management information from the cartridge memory CM mounted on the tape cartridge 100 or recording predetermined management information on the cartridge memory CM in response to a command the from control device 208. As a communication system between the reader/writer 207 and the cartridge memory CM, for example, an ISO14443 system is adopted.

The control device 208 includes, for example, a computer including a CPU (Central Processing Unit), a storage unit, a communication unit, and the like, and integrally controls the respective units of the tape drive device 200.

[Cartridge Memory]

Next, detailed description of the cartridge memory CM will be described.

(Basic Configuration)

Figure 3:
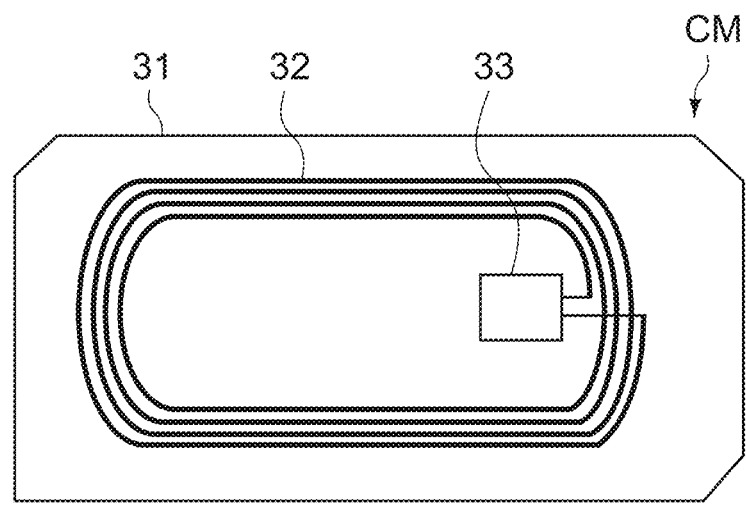
FIG. 3 is a schematic plan view showing a non-contact communication medium according to an embodiment of the present technology.

FIG. 3 is a schematic plan view showing the cartridge memory CM. The cartridge memory CM includes an RFID tag including a support substrate 31, an antenna coil 32, and an IC chip 33.

The support substrate 31 includes a relatively rigid wiring substrate such as a glass-epoxy substrate. The antenna coil 32 is a planar loop coil formed on the support substrate 31, and is made of a copper foil, an aluminum foil, or the like, which has a predetermined thickness. The IC chip 33 is a circuit component mounted on the support substrate 31 and electrically connected to the antenna coil 32.

The IC chip 33 includes, therein, a voltage generation unit, a memory unit, a control unit, and the like, the voltage generation unit generating an activation voltage on the basis of a signal magnetic field from the reader/writer 207 received via the antenna coil 32, the memory unit storing predetermined management information regarding the tape cartridge 100 or the magnetic tape 12, the control unit reading information from the memory unit. Examples of the predetermined management information include information regarding the tape cartridge 100 on which the cartridge memory CM is mounted, such as identification information (ID) of the tape cartridge 100 or the cartridge memory CM and management information of the data recorded on magnetic tape 12.

The cartridge memory CM receives a signal magnetic field transmitted from the reader/writer 207 by the antenna coil 32 to generate power, and thus operates without power supply. The power supply/communication frequency from the reader/writer 207 is 13.56 MHz, which is the same as that of NFC (Near Field Communication). A non-volatile memory (NVM) is used for the memory incorporated in the IC chip 33. The memory size is, for example, 4 kilobytes, 8 kilobytes, or 16 kilobytes, but may be 32 kilobytes, which is larger than these.

Here, the memory size of the cartridge memory of the LTO standard is increasing in proportion to the increase in the size of data recorded on the magnetic tape. As an example, the memory size of the cartridge memory, which has been 4 kB in LTO-1 to LTO-3, has increased to 8 kB in LTO-4 and LTO-5 and 16 kB in LTO-6 and LTO-7. It is expected that as the magnetic recording data size of LTOs further increases, the memory size of the cartridge memory increases to be 16 kB or more.

Meanwhile, as the memory size of the cartridge memory increases, the power consumed by the IC tends to increase. Further, also the electric power is assumed to increase associated with the increase in the memory size, e.g., the idle current of the power supply block increases due to the necessity to increase the stability of the power supply voltage to be supplied to the memory, or the digital power increases associated with processing complexity. In the standard, since it is specified as a requirement to operate at a constant magnetic field strength, innovation of ICs (reduced power consumption) and innovation antennas (increased power extraction from a reader/writer) that can cope with the increase in the electric power caused by the increase in the memory size may be further required in the future.

Further, in this type of cartridge memory, the resonant frequencies are adjusted by the capacitance built in the IC from the viewpoints of cost and reliability. However, the capacitive element of the IC has a variation in the capacitance value for each product due to variations in production. When the resonant frequency is shifted by such individual variation, the electric power that can be drawn from the antenna is reduced.

Figure 4:
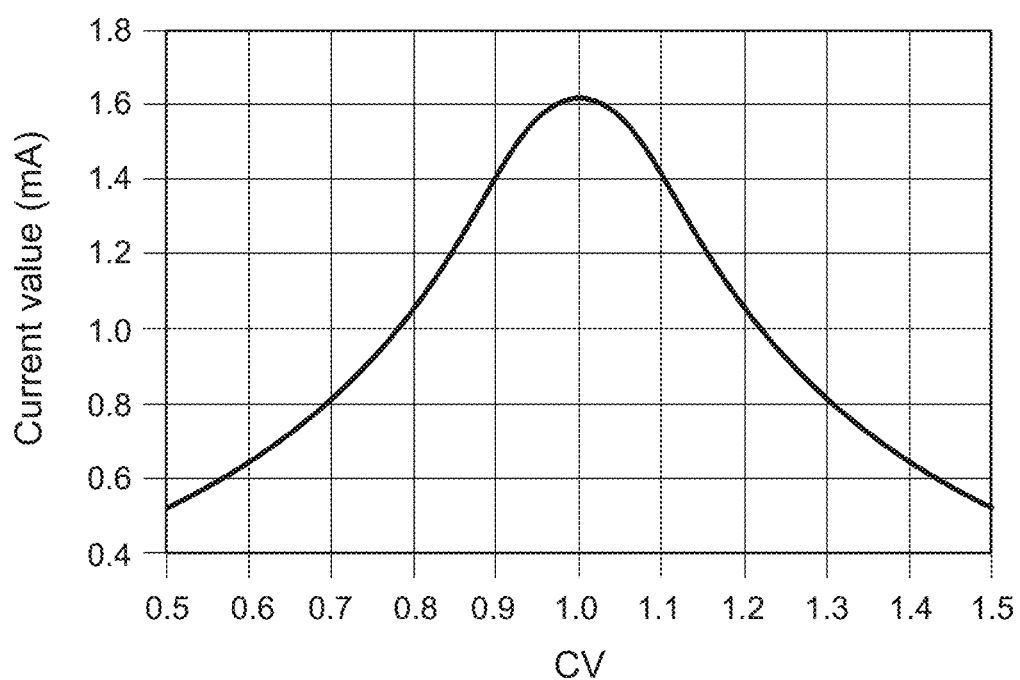
FIG. 4 is an experimental result showing an example of the relationship between a resonant capacitance value and an acquired current value in the above-mentioned non-contact communication medium.

FIG. 4 shows an experimental result showing an example of the relationship between the resonant capacitance value and the acquired current value. The horizontal axis indicates a rate of change of the resonant capacitance value, and the expected value (the capacitance value when the acquired current value is the highest) in the resonant capacitance is set to 1.0. Therefore, the resonant capacitance value of 1.1 represents a state in which the resonant capacitance is 10% larger than the expected value, and the resonant capacitance value of 0.9 represents a state in which the resonant capacitance is 10% smaller than the expected value. The vertical axis indicates the value of the current flowing to a constant load, which corresponds to electric power. As shown in the figure, when the resonant capacitance value deviates from the expected value, the current (electric power) that can be acquired decreases sharply. For example, when the resonant capacitance value varies by approximately 15%, the acquired current drops to $3/4$ of that in the case of the expected value.

Note that the peak current value (1.6 mA) when the resonant capacitance is an expected value is merely an example, and is an arbitrary value that can vary depending on the inductance value of the antenna coil, the load resistance value connected to the antenna coil, or the like as will be described below, in addition to the strength of the signal magnetic field transmitted from reader/writer.

Several methods of adjusting the resonant capacitance inside the IC are conceivable. In the cartridge memory of LTO, a partial region of the non-volatile memory is used as a region for storing a parameter for adjusting the resonant capacitance, and the resonant capacitance can be adjusted without requiring additional hardware. In this case, the IC chip 33 has, therein, a resonant capacitance unit that is electrically connected to the antenna coil 32 and has a variable capacitance value. The initial capacitance value of the resonant capacitance unit is measured in advance, and the capacitance value that is a correct value (expected value) or a set value relating to the difference between the measured value and a correct value (hereinafter, referred to as the resonant capacitance set value) is stored in the memory. Then, the resonant capacitance set value is read at the time of activation, and the resonant capacitance value is adjusted by using the read resonant capacitance set value as a correction parameter.

However, the electric power that can be acquired in a state where the capacitance value is shifted is lower than that in the case of the correct value (expected value) of the resonant capacitance, and the electric power for driving the memory tends to increase as the memory size increases. For this reason, there is a possibility that the process of reading the resonant capacitance set value stops due to power shortage and communication with the reader/writer is defective depending on the amount of deviation of the capacitance value before the adjustment of the resonant capacitance and the memory size.

In this regard, the cartridge memory CM in this embodiment optimized the characteristics of the antenna coil 32 as follows in order to extract large power from a signal magnetic field of a limited strength. Details thereof will be described below.

(Regarding Inductance Value)

Figure 5:
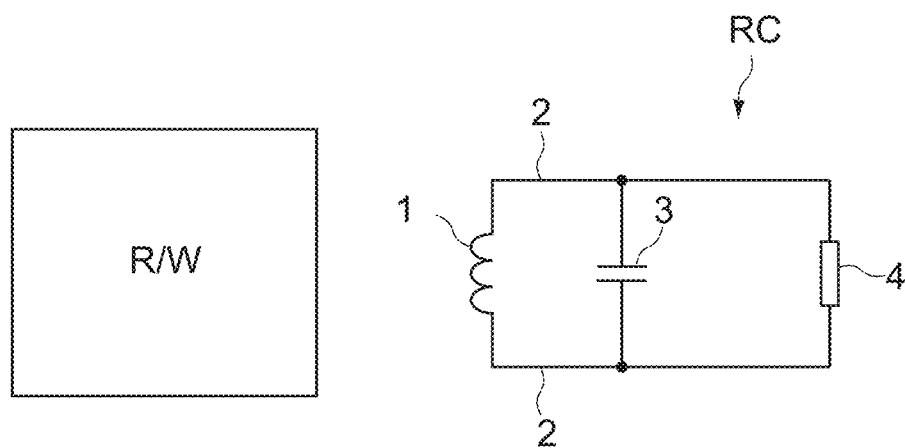
FIG. 5 is a simulation model of a resonant circuit described in Example.
Figure 6:
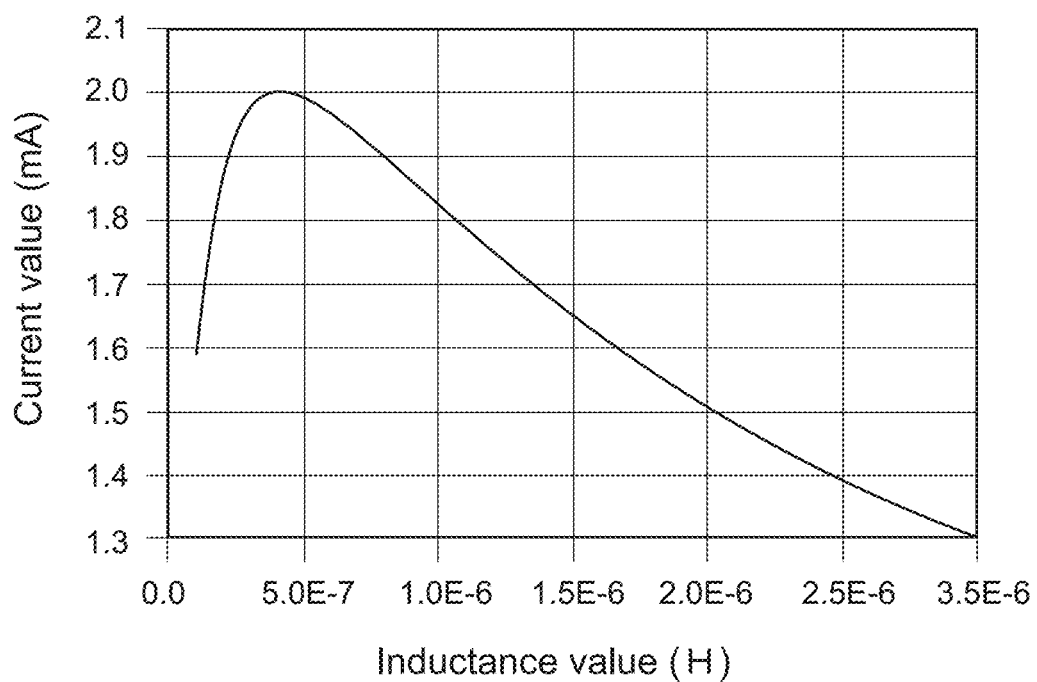
FIG. 6 is a simulation result showing the relationship between an L-value of an antenna coil and a load current.

The relationship between the inductance value (hereinafter, referred to also as L-value) of the antenna coil and the load current was evaluated using the simulation model shown in FIG. 5. The results are shown in FIG. 6. A resonant circuit RC in FIG. 5 includes a coil unit 1, and a resonant capacitance 3 and a load resistance 4 that are connected in parallel via wires 2 at both ends thereof. The frequency of the signal magnetic field transmitted from a reader/writer (R/W) was set to 13.56 MHz, the intensity thereof was set to 2.5 A/m, the resonant frequency of the resonant circuit RC was set to 13.56 MHz, and the resistance value of the load resistance 4 was set to 1 kΩ. In FIG. 6, the horizontal axis represents the L-value and the vertical axis represents the load current. It can be seen from FIG. 6 that the L-value at which the maximum power can be obtained is approximately 0.35 μH.

Figure 7:
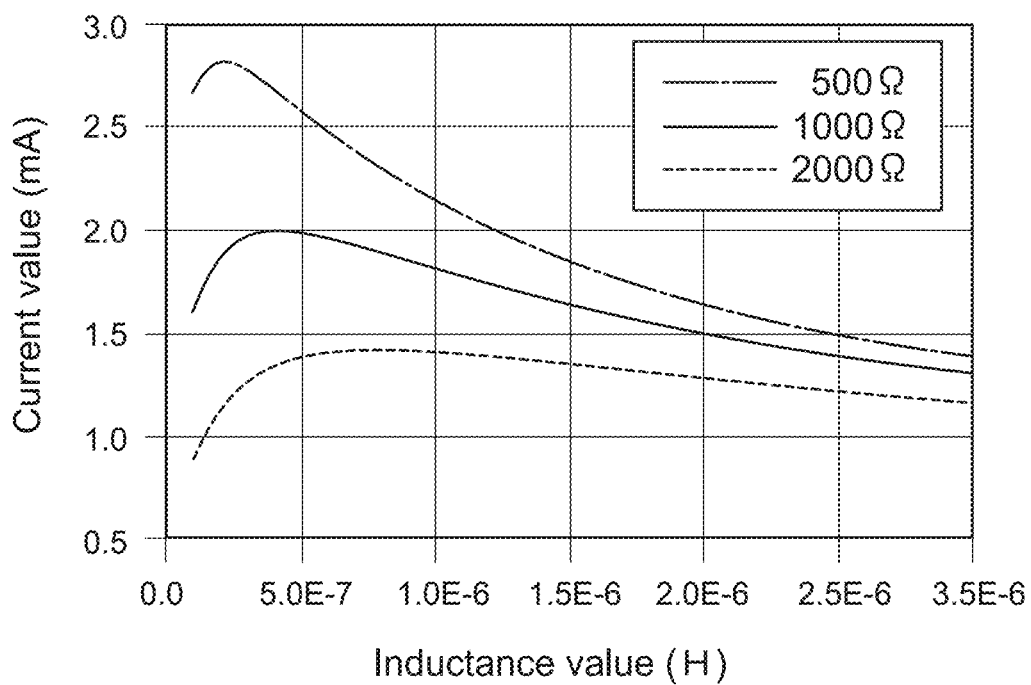
FIG. 7 is a simulation result showing the relationship between the L-value of the coil unit and the load current value when changing the resistance value of the load resistance.

Next, the relationship between the L-value of the coil unit 1 and the load current value when changing the resistance value of the load resistance 4 in the resonant circuit RC is shown in FIG. 7. In the figure, the dot-dash line, the solid line, and the broken line respectively represent the load current value when the load resistance value is 500Ω, the load resistance value is 1,000Ω, and the load resistance value is 2,000Ω. The increase in electric power due to the increase in memory size corresponds to the decrease in the load resistance. That is, it can be seen that the sensitivity of the L-value is increased by an increase in electric power in the future. When the resonant frequency matches the signal frequency, it can be seen that the largest power can be obtained by the L-value of approximately 0.3 μH to 0.7 μH although it also depends on the load.

Next, the variation of the resonant capacitance of the cartridge memory will be examined. The cartridge memory of LTO generally includes no external capacitance from the viewpoints of costs and reliability, and the resonant frequencies are adjusted by the internal capacitance. Therefore, it is necessary to consider the characteristics when the resonant capacitance varies. Although the resonant capacitance inside the IC depends on the process, the variation in the resonant capacitance value is generally assumed to be approximately 5% to 15%. Assumption is made that the resonant capacitance value has a variation of up to approximately 17% (4.1% in terms of the resonant frequency) even in view of variations in the antenna and other circuit components.

Figure 8:
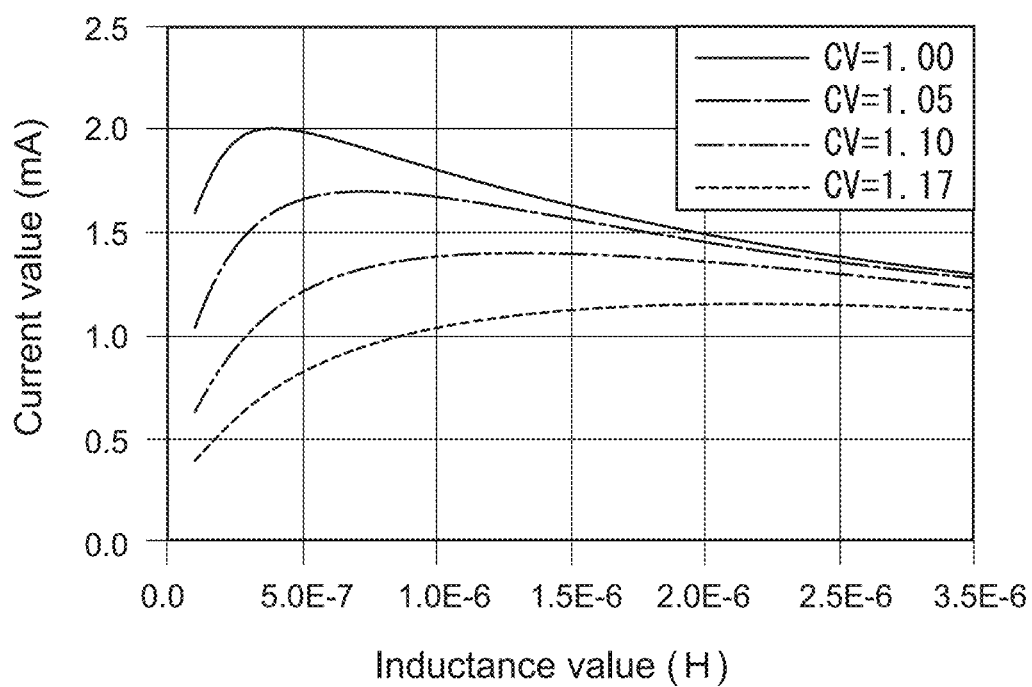
FIG. 8 is a simulation result showing the relationship between the L-value of the coil unit and the load current at the time of variation of the resonant capacitance value.
Figure 9:
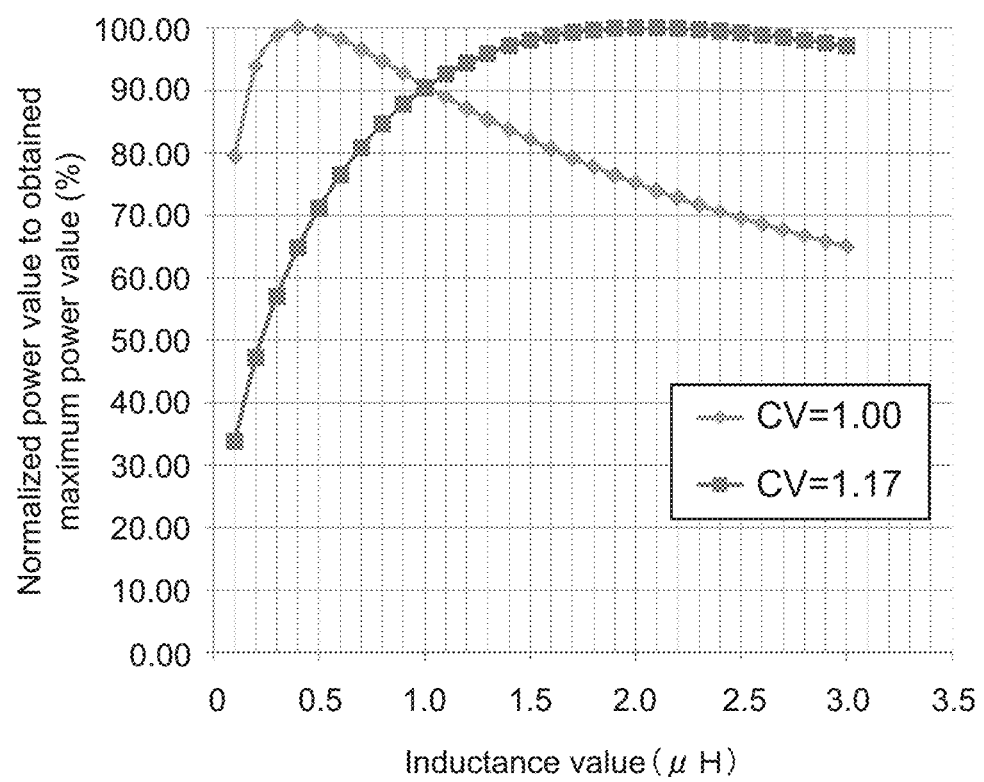
FIG. 9 is a diagram in which the result of FIG. 8 is normalized.

FIG. 8 shows the relationship between the L-value of the coil unit 1 and the load current at the time of variation of the resonant capacitance value in the resonant circuit RC. In the figure, the solid line, the dot-dash line, the two-dot chain line, and the broken line respective represent the load current value when the variation of the resonant capacitance value is 0% (CV=1.0), the load current value when the variation of the resonant capacitance value is 5% (CV=1.05), the load current value when the variation of the resonant capacitance value is 10% (CV=1.10), and the load current value when the variation of the resonant capacitance value is 17% (CV=1.17). It can be seen from the figure that if the L-value is too low, the obtained power tends to deteriorate more remarkably as the variation of the resonant capacitance value increases. FIG. 9 shows the values normalized with the maximum power value when the variation of the resonant capacitance value is 0% and 17%.

As shown in FIG. 9, if the resonant capacitance value varies by 17% (CV=1.17) at most, the electric power becomes maximum when the L-value is approximately 2.0 μH. From the results of FIG. 6 to FIG. 9, in the cartridge memory CM, the L-value of the coil unit of the antenna coil 32 is favorably 0.3 μH or more and 2.0 μH or less.

By setting the L-value to 0.3 μH or more, it is possible to maximize the obtained current when the variation of the resonant capacitance value is 0%, and thus, electric power can be obtained very efficiently from the signal magnetic field. Further, by setting the L-value to 2.0 μH or less, even when the resonant capacitance value is varied, it is possible to extract relatively large power. This makes it possible to eliminate power shortages that may occur with future increases in the memory size.

Figure 10:
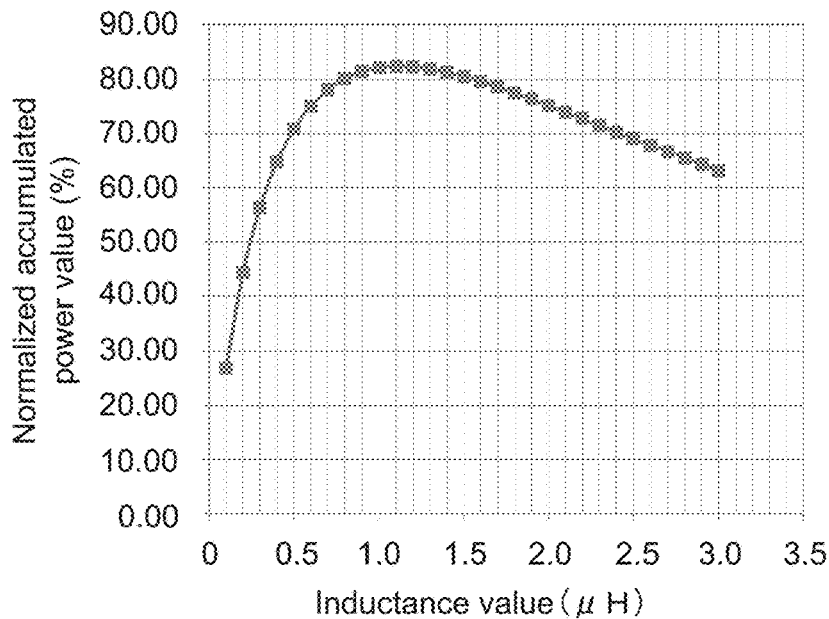
FIG. 10 is a diagram showing normalized integrated power values when the variation of the resonant capacitance value is 0% and 17%.

Further, normalized values when the variation of the capacity value was 0% and 17% were accumulated as indices of the power efficiency from FIG. 9, and the results as shown in FIG. 10 were obtained. Here, as the accumulated value, the value obtained by dividing the product of the normalized power value when the variation of the capacity value was 0% and the normalized power value when the variation of the capacity value was 17% by 100 was used. As shown in FIG. 10, the inductance value at which the accumulated value is 80% or more (rounded to the nearest decimal point) is 0.8 μH or more and 1.6 μH or less. That is, this range is the optimal L-value range in view of both the presence or absence of variations in the resonant capacitance value.

Figure 11:
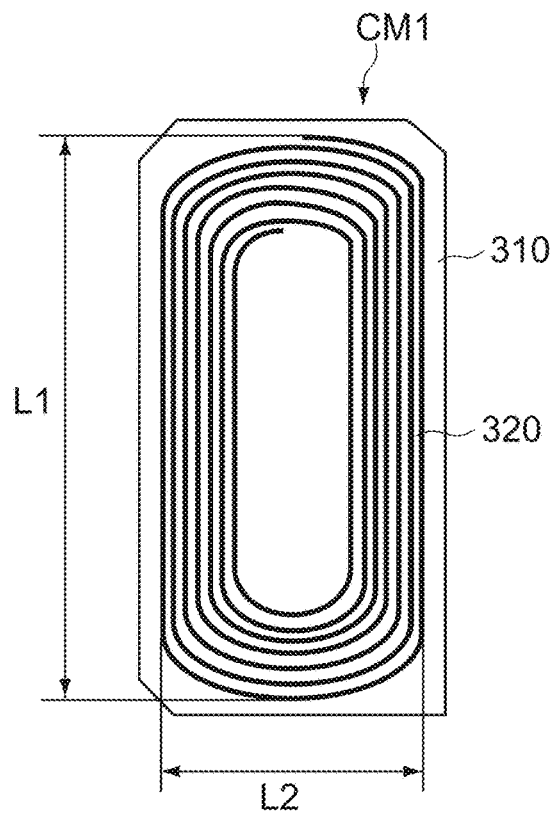
FIG. 11 is a schematic plan view of an antenna prepared in an Example.

The present inventors actually prepared an antenna on the basis of the simulation results described above, and performed power evaluation. FIG. 11 schematically shows a prepared antenna CM1. In the antenna CM1, a coil unit 320 patterned so that a copper foil having a thickness of 25 μm had a line width of 150 μm, a line space width of 75 μm, and the number of turns of 7 was formed on a glass-epoxy support substrate 310 having a long side of 19.9 mm and a short side of 9.95 mm. A maximum outer diameter L1 in the major axis direction of the coil unit 320 was 19.0 mm, the maximum outer diameter L2 in the minor axis direction was 9.0 mm, and the L-value (inductance value), R-value (resistance value), and Q-value at 13.56 MHZ were 1.255 μH, 2.575Ω, and 41.5, respectively.

Values obtained by measuring the widths and thicknesses of the 14 (the number of turns 7×2) wires on the support substrate 310 when the antenna CM1 was cut along the short side direction and averaging the measured values were used as the wire width and thickness of the coil unit 320. As the measuring device, for example, a digital microscope "VHX200" or a wide range zoom lens "VH-Z100R" manufactured by Keyence can be used.

A network analyzer "E5071C" manufactured by Agilent Technologies was used to measure the L-value, R-value, and Q-value of the coil unit 320. First, calibration processing was performed so that the physical quantity of the measuring jigs (obtained by processing an SMA connector and 2-pin sockets) using E-Cal kit (N4431-60006) manufactured by Agilent Technologies did not reflect the measured values. Next, the antenna CM1 was attached to the measuring jigs, and the L-value, R-value, and Q-value were measured. As each of the measured value, an average value obtained by performing measurement a plurality of times by the network analyzer was used.

As Comparative Example, a coil unit patterned so that a copper foil having a thickness of 30 µm had a line width of 125 µm, a line space width of 75 µm, and the number of turns of 12 was formed on a substrate of the same type as the support substrate 310. The maximum outer diameter of the coil unit in the major axis direction was 18.8 mm, the maximum outer diameter in the minor axis direction was 9.0 mm, and the L-value (inductance value), R-value (resistance value), and Q-value at 13.56 MHZ were 2.718 µH, 6.803Ω, and 34, respectively.

Figure 12:
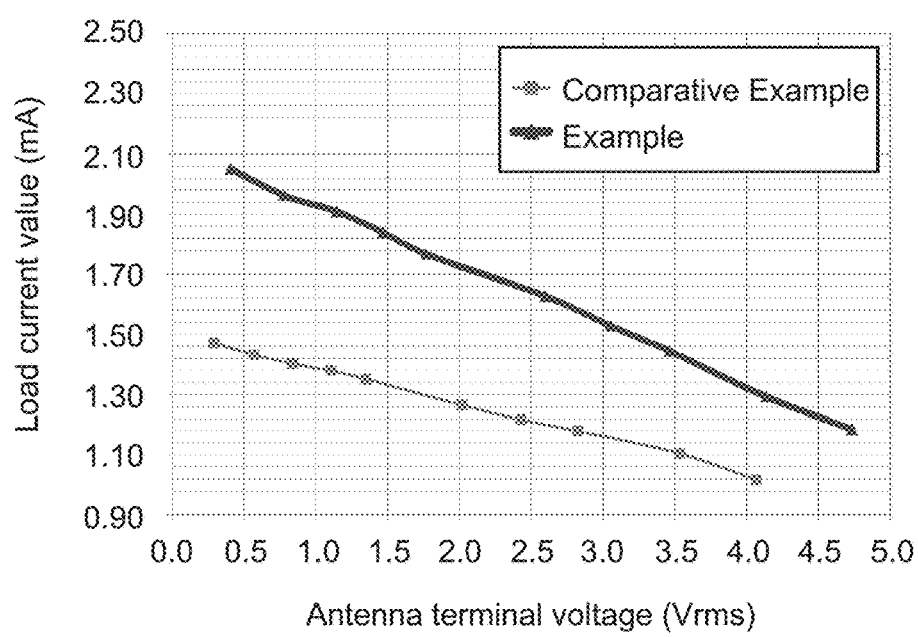
FIG. 12 is an experimental result showing the characteristics of the above-mentioned antenna together with Comparative Example.

The received power of the samples of antennas according to Example and Comparative Example were evaluated. The results are shown in FIG. 12. Here, using a uniform magnetic field generator defined by ISO10373-6, the voltage and current when the load of the reception-side antenna is changed when a constant magnetic field is generated, that is, the power obtained from the antenna, was measured. The resonant frequency was 13.56 MHz, and the magnetic field strength was 2.5 A/m.

In FIG. 12, the horizontal axis represents the antenna terminal voltage (Vrms) and the vertical axis represents the current value (mA) of the current flowing through the load. Since the product of the voltage and the current is electric power, the power increases as the measurement result is in the upper right of the figure. Therefore, the antenna CM1 according to this Example has a larger obtainable power than Comparative Example. From this, it was confirmed that the power that can be obtained was increased by reducing the inductance value of the coil unit 320.

(Regarding Q-Value)

Next, the Q-value of the antenna coil will be described.

Figure 13:
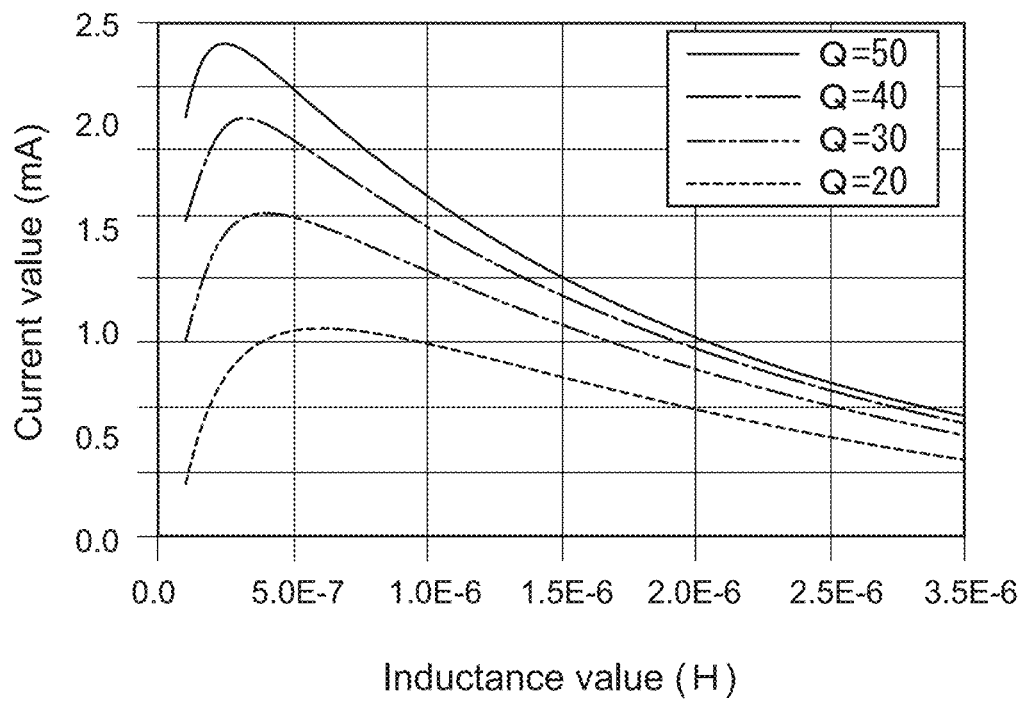
FIG. 13 is a simulation result showing Q-value dependency in the relationship between the L-value of the antenna coil and the load current.

The relationship between the L-value and the load current in the Q-value of the antenna coil is shown in FIG. 13. The solid line, the dot-dash line, the two-dot chain line, and the broken line in the figure respectively represent the load current value when Q is 50, the load current value when Q is 40, the load current value when Q is 30, and the load current value when Q is 20. The variation of the resonant capacitance value was set to 0%. It can be seen from the figure that the higher the Q-value is, the larger the electric power that can be obtained tends to be.

Figure 14:
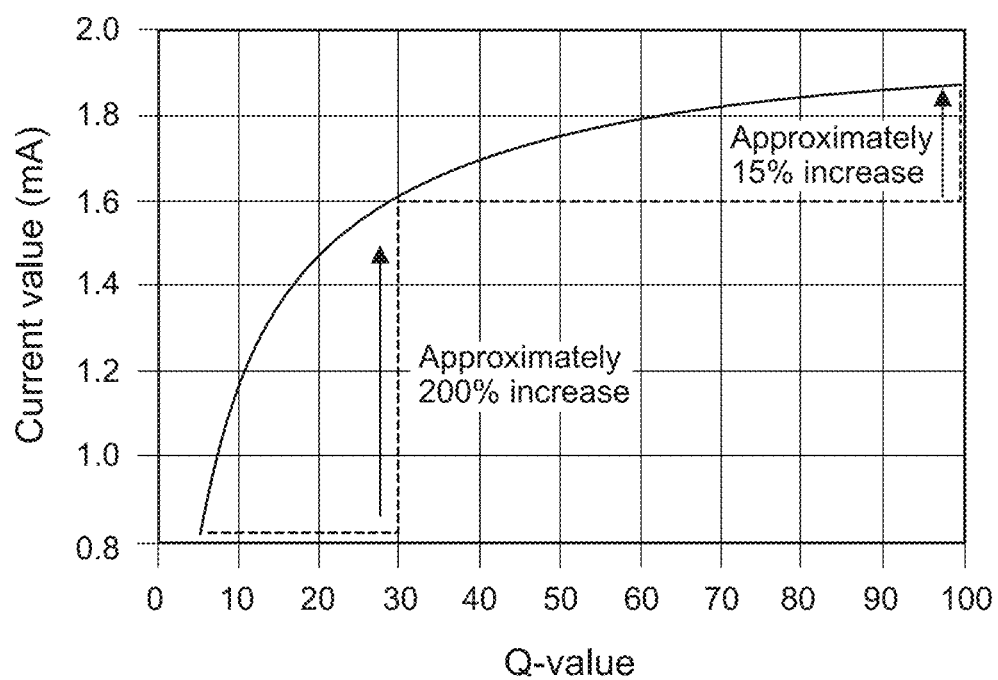
FIG. 14 is a diagram showing the relationship between the Q-value and the load current value in the antenna coil of L=1.6 µH.

FIG. 14 shows the relationship between the Q-value and the load current when the L-value is 1.6 µH. In the figure, the horizontal axis represents the Q-value and the vertical axis represents the load current. The current increases sharply until the Q-value is approximately 30, but thereafter, the slope becomes gentle. From this result, it can be said that the Q-value of 30 or more is favorable in that relatively large power can be stably secured.

Here, when the angular frequency is indicated by ω, the Q-value of the antenna can be expressed by the following formula.

$$Q = \omega L/R$$

Since ω is a constant frequency and does not change, it is necessary to increase the L-value or decrease the R-value in order to increase the Q-value.

However, the L-value cannot be increased because it has the optimum value (0.3 µH or more and 1.6 µH), as described above. Therefore, it is favorable that the R-value is as low as possible. Specifically, it is favorable to widen the line width and increase the thickness of the coil unit. Meanwhile, from the viewpoint of miniaturization, the antenna coil 32 of the cartridge memory CM in the LTO standard is required to have the maximum outer diameter in the major axis direction of 20 mm or less and the maximum outer diameter in the minor axis direction of 10 mm or less, and thus, it is difficult to widen the line width. Therefore, it is more practical to improve the Q-value by increasing the thickness of the coil unit.

Figure 15:
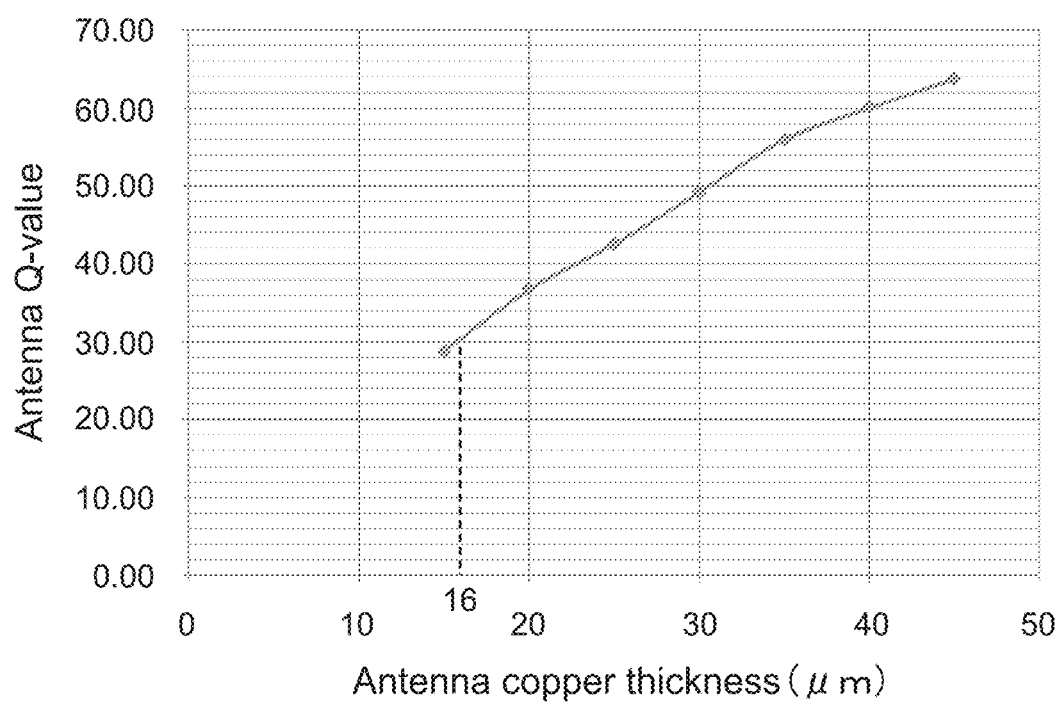
FIG. 15 is an electromagnetic simulation result showing the relationship between the thickness of a copper foil forming the antenna coil and the Q-value.

FIG. 15 shows the results obtained by electromagnetic simulation (HFSS) of the relationship between the thickness of the coil unit 320 and the Q-value using the antenna CM1 prepared in the above-mentioned Example. In the figure, the horizontal axis represents the thickness of the coil unit 320 (thickness of the copper foil), and the vertical axis represents the Q-value of the antenna CM1. It can be seen from the figure that the thickness and the Q-value of the copper foil are substantially proportional to each other. It has been confirmed that the thickness of the copper foil needs to be approximately 16 µm or more in order to realize the above-mentioned Q-value of 30 or more.

As described above, in the cartridge memory CM in this embodiment, by setting the L-value of the coil unit of the antenna coil to 0.3 µH or more and 1.6 µH or less, relatively large power can be extracted. Further, the cartridge memory CM is less susceptible also to the influence of variations in the resonant capacitance value, and it is possible to secure stable power. As a result, electric power can be stably obtained even under the limited signal magnetic field. Therefore, the stable communication operation with a reader/writer can be ensured, and it is possible to sufficiently deal with an increase in power consumption due to an increase in the memory size in the future.

Although the embodiment of the present technology have been described above, it goes without saying that the present technology is not limited to the above-described embodiment and various modifications can be made.

For example, in the above-mentioned embodiment, the cartridge memory mounted on the magnetic tape cartridge of the LTO standard has been described as an example, but the present technology is not limited thereto and is applicable also to a cartridge memory for a magnetic tape cartridge of another standard other than LTO.

Further, the present technology is applicable also to an information recording medium other than the magnetic tape, e.g., optical discs, magneto-optical discs, semiconductor memories, or cartridge memories for portable hard disc drives.

Further, the present technology is not limited to the cartridge memory mounted on the information recording cartridge, and the present technology is applicable also to commuter passes, entrance/exit control cards for expressways or buildings, as well as ID tags attached to electronic apparatuses, vehicles, robots, logistics products, book collections, and the like.

It should be noted that the present technology may take the following configurations.

(1) A non-contact communication medium for a recording medium cartridge, including:

a circuit component that has a memory unit capable of storing management information relating to the recording medium cartridge therein;

a support substrate that supports the circuit component; and an antenna coil that includes a coil unit that is electrically connected to the circuit component and formed on the support substrate, an inductance value of the coil unit being 0.3 µH or more and 2.0 µH or less.

(2) The non-contact communication medium according to (1) above, in which a maximum outer diameter of the coil unit in a major axis direction is 20 mm or less, and a maximum outer diameter of the coil unit in a minor axis direction is 10 mm or less.

(3) The non-contact communication medium according to (1) or (2) above, in which the inductance value of the coil unit is 0.8 µH or more and 1.6 µH or less.

(4) The non-contact communication medium according to any one of (1) to (3) above, in which a Q-value of the antenna coil is 30 or more.

(5) The non-contact communication medium according to any one of (1) to (4) above, in which the antenna coil is made of a copper foil having an average thickness of 16 µm or more.

(6) The non-contact communication medium according to any one of (1) to (5) above, in which the memory unit includes a non-volatile memory element having a memory capacitance of 16 kilobytes or more.

(7) The non-contact communication medium according to any one of (1) to (6) above, in which the circuit component further has a resonant capacitance unit that is electrically connected to the antenna coil and has a variable capacitance value therein.

(8) A recording medium cartridge, including:

an information recording medium;

a cartridge case that houses the information recording medium; and a non-contact communication medium that includes a circuit component that has a memory unit capable of storing management information relating to the information recording medium therein, a support substrate that supports the circuit component, and an antenna coil that includes a coil unit that is electrically connected to the circuit component and formed on the support substrate, an inductance value of the coil unit being 0.3 µH or more and 2.0 µH or less.

(9) The recording medium cartridge according to (8) above, in which the information recording medium is a magnetic tape.

(10) The recording medium cartridge according to (9) above, in which the information recording medium is a magnetic tape cartridge of an LTO (linear tape open) standard.

REFERENCE SIGNS LIST cartridge case
12 magnetic tape
31 support substrate
32 antenna coil
33 IC chip
100 tape cartridge
200 tape drive device
CM cartridge memory
CM1 antenna

The invention claimed is:

1. A non-contact communication medium for a recording medium cartridge, comprising:

a circuit component that has a memory unit capable of storing management information relating to the recording medium cartridge therein;

a support substrate that supports the circuit component; and an antenna coil that includes a coil unit that is electrically connected to the circuit component and formed on the support substrate, wherein the circuit component is provided within an inner loop of the coil unit, and the coil unit is configured to provide electrical power to the circuit component, wherein the coil unit has a single coil structure with a maximum outer diameter in a major axis direction equal to 20 mm or less and a maximum outer diameter in a minor axis direction equal to 10 mm or less and the coil unit with the single coil structure has an inductance value from 0.3 µH to 0.7 µH.

2. The non-contact communication medium according to claim 1, wherein a Q-value of the antenna coil is 30 or more.

3. The non-contact communication medium according to claim 1, wherein the antenna coil is made of a copper foil having an average thickness of 16 µm or more.

4. The non-contact communication medium according to claim 1, wherein the memory unit includes a non-volatile memory element having a memory capacitance of 16 kilobytes or more.

5. The non-contact communication medium according to claim 1, wherein the circuit component further has a resonant capacitance unit that is electrically connected to the antenna coil and has a variable capacitance value therein.

6. A recording medium cartridge, comprising:

an information recording medium;

a cartridge case that houses the information recording medium; and a non-contact communication medium that includes a circuit component that has a memory unit capable of storing management information relating to the information recording medium therein, a support substrate that supports the circuit component, and an antenna coil that includes a coil unit that is electrically connected to the circuit component and formed on the support substrate, wherein the circuit component is provided within an inner loop of the coil unit, and the coil unit is configured to provide electrical power to the circuit component, wherein the coil unit has a single coil structure with a maximum outer diameter in a major axis direction equal to 20 mm or less and a maximum outer diameter in a minor axis direction equal to 10 mm or less and the coil unit with the single coil structure has an inductance value from 0.3 µH to 0.7 µH.

7. The recording medium cartridge according to claim 6, wherein the information recording medium is a magnetic tape.

8. The recording medium cartridge according to claim 7, wherein the information recording medium is a magnetic tape cartridge of an LTO (linear tape open) standard.

* * * * *